United States Patent Office 3,517,798
Patented June 30, 1970

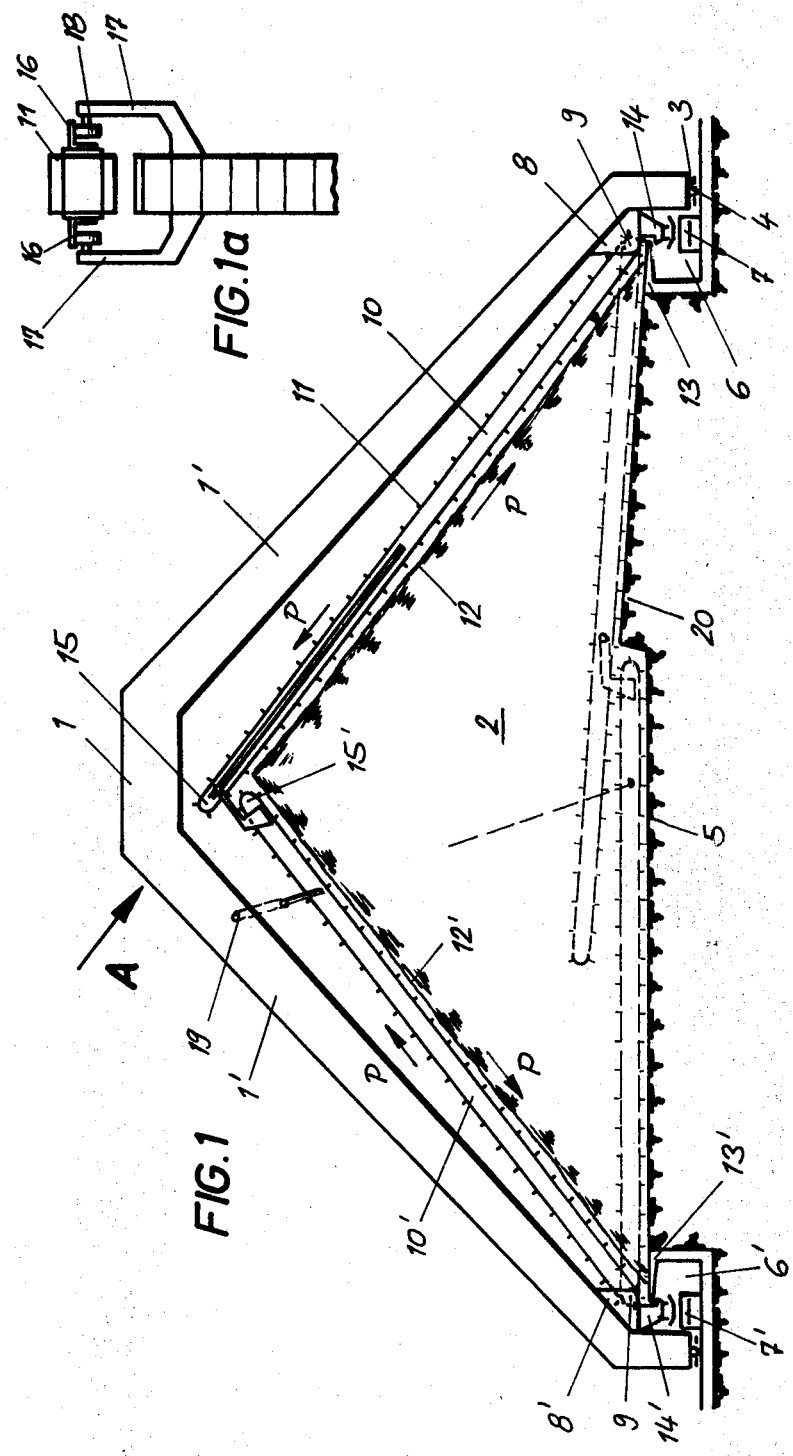

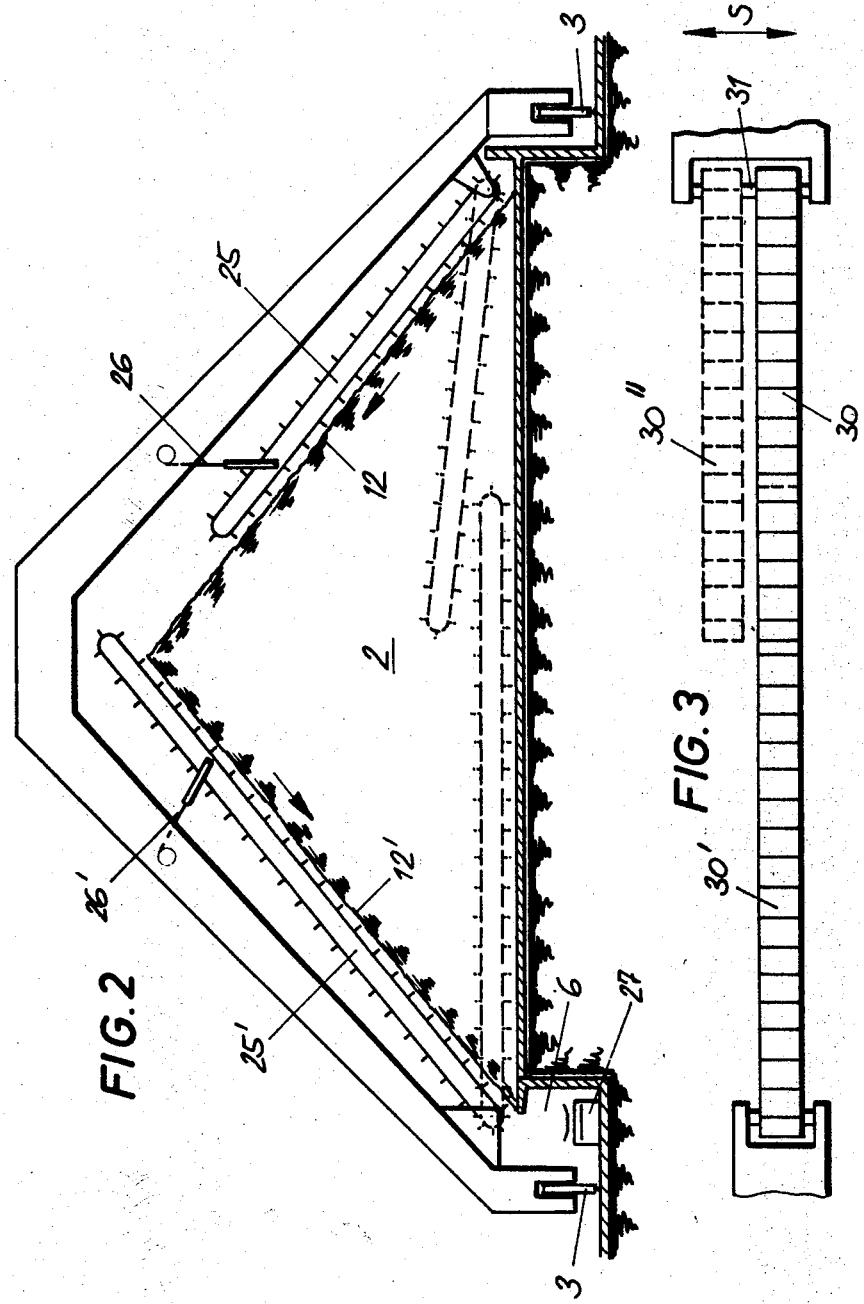

---

3,517,798
DUMP SCRAPERS
Günter Ströcker, Holzwickede, Germany, assignor to
Gustav Schade, Maschinenfabrik
Filed Feb. 3, 1969, Ser. No. 795,908
Claims priority, application Germany, Feb. 12, 1968,
1,284,899
Int. Cl. B65g *65/28*
U.S. Cl. 198—36          8 Claims

ABSTRACT OF THE DISCLOSURE

A dump scraper includes a frame having spaced-apart base portions and legs extending upwardly toward one another from the base portions, scraper booms are pivotally attached to each of the base portions. The booms may be interconnected and movable in a common plane between raised and lowered positions. The connection may permit limited relative angular movement between the two booms and may be quick-detachable. One boom may be laterally movable at its pivot for placing the booms in side-by-side relation in their lowered position.

---

The present invention relates to a dump scraper with a frame spanning the dump and able to traverse along it, to which frame, in the neighborhood of the bases of its two legs, in each case there is articulatingly connected a scraper boom pivotable in the vertical plane about an axis fixed in relation to the frame, the sum of the lengths of the two scraper booms being greater than the distance between their respective pivot points.

In order to remove material from dumps of bulk materials, dump scrapers of frame design are known in which several scraper booms, pivotable in the vertical plane and co-operating with the two sloping sides of the dump, are suspended from a rail-traversed frome which spans the dump. The advantages of frame-type scrapers over other designs, reside in their efficient exploitation of ground area, the uniformity with which they displace the material, and the facility they provide for effecting a rapid change from one to another of various kinds of bulk materials contained in a dump.

In one known frame-type scraper, a scraper boom working one of the faces of the dump is located (considered in a plan view) between two scraper booms working the other face, so that the said booms are disposed side-by-side in different planes. If the dump is made up of several kinds of bulk materials which are located in bays formed between vertical partition walls, then, considered in plan view again, the staggered rake guides of the scraper booms can only be moved up towards the particular partition wall to the extent allowed by that rake guide which is furthest forward in that direction. In this position of the scraper system, the rake guide working the other face of the dump and set back considered in the direction of traverse, is still at a considerable distance from the wall, possibly in the order of between 1 and 2 metres. Accordingly, therefore, in this region the bulk material being handled will not be shifted, at least if (and this is often the case) it has a very steep angle of repose. With progressive removal of material from the dump, this phenomenon can give rise to the formation of precarious, thick and high walls of bulk material adhering to the walls of the bay or also to the gable walls of the dump, and these cannot be removed without difficulty and constitute a considerable source of danger because of the risk of their sudden collapse.

A further known frame-type dump scraper is one which, in the plan view, has rake guides which are in line with one another so that complete removal of the dump material right up to the immediate vicinity of the walls of the bays, is possible. In this case, however, there is the drawback that the scraper boom is a folding one, i.e. it is designed to knee, the boom sections (in line with one another in the longitudinal direction of the boom) being linked with one another through a joint. This articulating design of the scraper boom means increased constructional outlay and therefore an increased risk of breakdown. Also, the transverse stability of the boom is substantially reduced in particular where long boom lengths are involved.

It is the aim of the invention to overcome the aforestated drawbacks of known frame-type scrapers, i.e. to create a frame-type scraper which enables complete removal of the bulk material from the neighborhood of any bay walls and gable walls associated with the dump, and which enables the dump to be cleared without forming any overhangs. The frame-type scraper is intended at the same time to be simple and reliable in design.

The frame-type scraper in accordance with the present invention is characterized by the fact that the scraper booms pivotally attached to the two base regions of the frame legs, can swing in a common vertical plane and, in the lowered condition at least, overlap one another at their free ends.

In accordance with a further essential feature of the present invention, one of the two scraper booms located in the common vertical plane, has its free end guided on the other scraper boom, in the longitudinal direction of said latter and in such a way as to permit angular movement. In this case, therefore, the two scraper booms articulatingly attached to the two sides of the frame and pivoting in a common vertical plane, are so coupled with one another in the neighborhood of those of their ends opposite their points of pivot, that they are lowered together compulsorily, the angle between them altering, without any need for corresponding control of the lifting gear associated with them and without any risk of the circulating scraper rakes on the two booms fouling one another, something which could happen if the lifting gear were to be wrongly operated. In this context, the arrangement can advantageously be so contrived that one scraper boom rests on the free end of the other, or that the free end of one boom is suspended from that of the other. In either event, the arrangement is so contrived that the distance between the tip of the lower boom and the underside of the boom above it, remains virtually constant throughout the full range of swing.

Since, thus, one of the scraper booms is positively moved by the other during the lowering movement, the facility is obtained for controlling both of them by only one piece of lifting gear which engages a particular one of the two booms, the other boom being controlled by virtue of the manner in which it is guided vis-a-vis the first boom, so that it follows the pivoting movement of the latter.

The said coupling between the two scraper booms can be effected in a variety of ways. Preferably one of the two scraper booms will be equipped at its tip, preferably mounted on arms or the like, with sliding bearings, runners or rollers, which are guided in appropriate guides on the other boom in such a fashion that the two booms can move angularly in relation to one another during the sinking movement. The guides are in this context so arranged on the side faces of the particular scraper boom that they extend from the boom tip in the direction towards the boom pivot. It is also possible, however, to equip both scraper booms with suitable lifting gear, the lifting gear for one boom possibly only being operated as an auxiliary device when both the booms have for example been lowered virtually to the base of the dump. It is then possible to swing up that boom whose end zone overhangs that of the other boom, independently of said other boom (which is underneath it) using said auxiliary lifting gear in order, after having swung up the other boom, to rake out the wedge of bulk material hitherto lying inaccessible beneath said first boom. In this case, it is advisable so to arrange the link between the two scraper booms at the slide or roller guide arrangement, that it can easily and quickly be released. Particularly advantageous in this context is an arrangement in which the coupling between the two booms can be released simply by lifting one of the two booms, preferably the one which is topmost in the arrangement.

In the case of the dump scraper of the present invention, the arrangement can be such that the two scraper booms in each case feed the material in the direction towards their respective pivot points, located near the base of the dump. In this case, at either side of the dump a conveyor belt will be arranged by means of which the bulk material fed down by the particular associated scraper boom, is transported away. On the other hand, however, it is possible to arrange for only one conveyor belt, located at one side of the dump only. In this case, the scraper boom located at the other side of the dump will feed material up the corresponding sloping face with its bottom run of rakes so that in effect it feeds the material to the other scraper boom, operating at that side of the dump at which the conveyor is located.

In accordance with yet another feature of the invention, that of the scraper booms which is topmost in the lowered condition, can be arranged to be transversely displaceable at the joint with the frame, so that it can be moved from a position in which it is located in a common vertical plane with the other boom and partially overlap same, into a position in which it is disposed to one side of said other boom and can therefore operate in proximity of the ground, to one side of said other boom. The displacement of the scraper boom in this fashion can be effected by suitable devices such as fluid-operated rams or the like.

Finally, it is also possible to provide at either side of the frame more than just one scraper boom, although in this case too the mutually co-operating booms will in each case be located in a common vertical plane.

Using the dump scraper in accordance with the invention, therefore, it is possible to shift bulk material from positions very close to any bay walls which may be provided and over the full width of the dump. Since each scraper boom is independently mounted directly on the frame and the two booms, in the preferred embodiment of the invention, support one another through the medium of the said guide arrangements, the booms are comparatively stable in the transverse sense so that using this kind of system substantially larger dump widths can be spanned than is possible with conventional systems of this general design.

The invention will now be described with reference to the accompanying drawings which illustrate the invention but in no restrictive sense.

FIG. 1 schematically illustrates a plan view of a dump scraper in accordance with the invention, of frame design;

FIG. 1a illustrates the coupling and guiding of the two booms in the region above the pivots (the pivots are located at the base of the dump); the view is an end elevation taken in the direction of the arrow A in FIG. 1;

FIG. 2 illustrates a further example of the frame-type scraper of the invention, in plan;

FIG. 3 is a schematic plan view of the arrangement of a scraper boom which, in accordance with the invention, can be displaced at its pivot position.

In FIGS. 1 and 1a, which illustrate a preferred embodiment of the invention, the reference 1 indicates a frame spanning the dump 2 of bulk material and running at either side of the dump, through its legs 1', on rails 4 which are laid below the level of the dump base 5 in trenches 6 and 6' extending along the length of the dump and designed to take conveyor systems. In the two trenches 6 and 6' there are located, side by side and parallel with the rails, respective belt conveyors 7 and 7'. By means of these conveyors, the bulk material being removed from the dump is conveyed away.

The frame 1, which is symmetrical vis-a-vis its own central plane, is equipped at either side of the dump and at the level of the base 5 thereof, with a bracket 8 and 8' respectively, in which there is mounted to pivot in the vertical plane a scraper boom 10 and 10' as the case may be, a pivot pin 9 and 9' respectively being provided in horizontal attitude. The two scraper booms 10 and 10' are of known design. They each carry on the boom frame endless chains running parallel with one another along the length of the boom and linked together at intervals by scraper rakes 11, the chains being driven in the direction of the arrow P so that when lowered onto the slope 12 or 12' as the case may be, on the dump, they move the bulk material in an amount corresponding to their depth of penetration into it, in the direction towards the pivot pins 9 and 9' respectively, until it eventually moves over the ramp of a dump boundary wall 13 or 13', as the case may be, into a hopper 14 or 14' respectively which discharges the material onto the particular conveyor belt 7 or 7' as the case may be.

As FIG. 1 indicates, the two scraper booms 10 and 10' have a combined length which is greater than the span between the pins 9 and 9' of the booms. Since the booms, furthermore, are located in a common vertical plane, they overlap one another to a greater or lesser extent depending upon their position of pivot, and the maximum overlap occurs, as shown in broken-line in FIG. 1, when they are in the fully lowered position. The boom 10 is somewhat longer than the 10'. The length of the booms is so contrived that even in the fully raised position shown in FIG. 1, the tip 15 of boom 10 overlaps the tip 15' of boom 10'.

As FIG. 1a shows particularly well, the frame of the boom 10 incorporates, at its two opposite side faces, respective guides in the form of a rail 16 running from the tip 15 of the boom to a point approximately halfway along its length. The rails 16 are here in the form of an angle-iron attached to the side faces of the boom.

The other boom 10' is provided in the neighborhood of its tip 15' with arms 17 or the like which are attached to the side faces of the boom and carry rollers 18 at their ends, said rollers co-operating with the rails 16. Since the boom 10 in this case has no independent lifting gear associated with it, it rests through the rails 16, the rollers 18 and the arms 17 on the boom 10' located beneath it, the latter, itself, being provided with facility for raising and lowering in the vertical plane through lifting gear 19 consisting of a winch and block and tackle arrangements. The boom 10 resting upon boom 10' follows this pivoting movement and, as the two booms progressively lower the angle included between them becomes larger until finally, in the lowered condition, the boom 10 is positioned a small distance above the approximately horizontally disposed boom 10'. During the lowering phase, the rollers 8 run over the rail guides 16 in the direction towards the pivot 9. The arrangement is so contrived that the distance between the tip 15' of the boom 10' and the bottom side of the top boom 10 remains virtually constant over the full range of swing. This distance is relatively small but is of course sufficiently large to ensure that the circulating rakes 11 on the two booms cannot foul one another, since this would of course means destruction of these components and of the chain drive arrangements.

Since the top boom 10 rests upon the boom 10' beneath it, in such a fashion as to permit of relative angular movement, the boom 10 need not necessarily be equipped with its own lifting gear 19. However, it is possible quite simply to equip the boom 10 with lifting gear as well, so that the lower boom 10' can have the weight of the top boom removed from it. On the other hand, the boom 10' may also be equipped with an auxiliary lifting gear arrangement, whose purpose is to lift the boom 10 away from the boom 10' beneath it, when in the fully lowered position, so that the lower boom 10' can be swung up and away. Then, the boom 10 can be lowered again in order to rake out the wedge 20 of material still untouched on the base of the dump.

As described, the coupling of the two booms 10 and 10' through the arms 17 and the roller guide arrangements 16, is so contrived that the pivoting movement of the two booms is not impeded by this coupling, although on the other hand the tip 15' of the lower boom 10' is maintained at a short, substantially constant interval from the underside of the top boom 10, the booms bearing against one another through the said coupling elements and guiding one another. The coupling is so contrived that the top boom 10 can be lifted freely away from the lower boom 10' without in any way being impeded by the coupling element. It is entirely possible of course to design the coupling in another fashion, although it is recommended that it be designed in quick release fashion, e.g. using extractable pins or the like, in order to be able to raise and lower the booms independently of one another.

Instead of the roller guide arrangement, a sliding pair could equally well be employed. Also, it is possible to equip exclusively the top boom 10 with lifting gear. In this case, the bottom boom 10' will be suspended through suitable coupling elements from the top boom 10 and at the same time be arranged to displace in the guides 16.

It is clear to see that with the two booms 10 and 10' operating on both slopes 12 and 12' of the dump 2, material can be removed simultaneously and uniformly without giving rise to any overhang formations. Since the booms 10 and 10' are located in a common vertical plane, they can be traversed onto a point directly adjacent to the limiting walls of the dump or to any partition walls which may be used to form bays.

In the embodiment of FIG. 2, two booms 25 and 25' are provided working in a common vertical plane, whose lengths are likewise so contrived that in the lowered condition (shown in broken-line) they overlap one another. The lower boom 25' is considerably longer than the upper boom 25. There is no connection between the booms in the region above the pivots 9 and 9' in this case. The two booms are independently raisable and lowerable through their own lifting gear arrangements 26 and 26' respectively. Also, in this embodiment only a single conveyor belt 27 is provided to convey the material away, and this is located in the trench 6' below the point of discharge from the boom 25'. The boom 25' scrapes the bulk material down the slope 12' as the frame moves along the dump, and feeds it onto the conveyor 27 and is lowered by an amount corresponding to the depth of rake, with each pass. The boom 25 feeds in the opposite direction, i.e. it rakes the bulk material up the slope 12 so that the material is fed to the boom 25'. The use of the boom 25 purely as a feeder for the boom 25', thus provided the possibility of clearing the dump over the full width and means that there is no possibility of any overhang formations being left above the sinking boom 25', as the clearing operation goes on. The mode of operation is generally such that first of all exclusively the boom 25' is working. As soon as this boom 25' has dropped to such an extent that its tip is a certain distance beneath the boom 25, then the latter can be set into operation too and during the remainder of the clearing process feeds the bulk material to the boom 25'.

FIG. 3 shows two booms 30 and 30' which may be taken to be identical with those 10 and 10' or 25 and 25'. The upper boom 30, which in this case has a shorter length than the lower boom 30', is mounted on its pivot pin 31 in such a fashion as to be displaceable in the direction of traverse of the frame, i..e. in the direction of the arrow S, so that it can be shifted from a position in which the two booms 30 and 30' are in a common vertical plane and overlap one another to a certain extent, into a position 30" in which it is located to one side of the boom 30'. In this position, the layer of bulk material (layer 20 in FIG. 1) left beneath the top boom 30 on the base of the dump, can be cleared by the boom 30. In order to enable this lateral shift to take place in both directions, the pivot pin 31 has a length which is more than twice the width of the boom 30 at the pivot location. The displacement can be produced with the aid of suitable devices such as fluid-operated rams or the like.

It goes without saying that in the embodiment of FIG. 1 too, it is possible to provide only one conveyor belt 7 or 7' as the case may be. In this case, one of the two booms will act as a feeder and move the bulk material up the slope so that it is picked up by the other boom, the pivot location of which is positioned above the conveyor belt, and can then be transported away.

Having thus described my invention, I claim:

1. A dump scraper having a frame, said frame including spaced-apart first and second base portions and first and second leg means extending upwardly toward one another from said base portions, scraper boom means pivotally attached to each of said base portions at pivot points for pivotal movement in a vertical plane substantially parallel to said leg means said scraper boom means having a combined length greater than the distance between said pivot points, said scraper boom means being pivotable in a common vertical plane between raised and lowered positions, said scraper boom means overlapping one another in said lowered position.

2. The device of claim 1 wherein said scraper boom means are interconnected by connecting means, said connecting means including lost motion means for providing relative pivotal movement of one of said scraper means relative to the other in a common vertical plane.

3. The device of claim 2 wherein said connecting means comprises bearing means fixed to one of said scraper boom means and guided in the other of said scraper boom means.

4. The device of claim 2 wherein said connecting means comprises a quick-detachable separable connection, said connection being separable by lifting one of said scraper boom means away from the other of said scraper boom means.

5. The device of claim 1 and including lifting means for moving said scraper boom means between said raised and lowered positions, said lifting means being connected with only one of said scraper boom means and the other of said scraper boom means being interconnected with said one scraper boom means for pivotal movement therewith.

6. The device of claim 1 wherein said scraper boom means feeds in one direction from said first base portion toward said second base portion, one of said scraper boom means feeding to the other of said scraper boom means, and conveyor means positioned adjacent said second base portion.

7. The device of claim 1 wherein said scraper boom means feed in opposite directions, each of said scraper boom means feeding toward the base portion to which it is attached, and conveyor means positioned adajacent each of said base portions.

8. The device of claim 1 wherein one of said scraper boom means is above the other of said scraper boom means in said lowered position, said one scraper boom means being pivotally connected to said base portion by laterally adjustable pivot means for providing lateral movement of said one scraper boom means to place said one scraper boom means in side-by-side relation to the other scraper boom means in said lowered position.

References Cited

FOREIGN PATENTS 648,720  11/1962  Italy.

ROBERT G. SHERIDAN, Primary Examiner

F. E. WERNER, Assistant Examiner

U.S. Cl. X.R.

214—10